Figure 1:
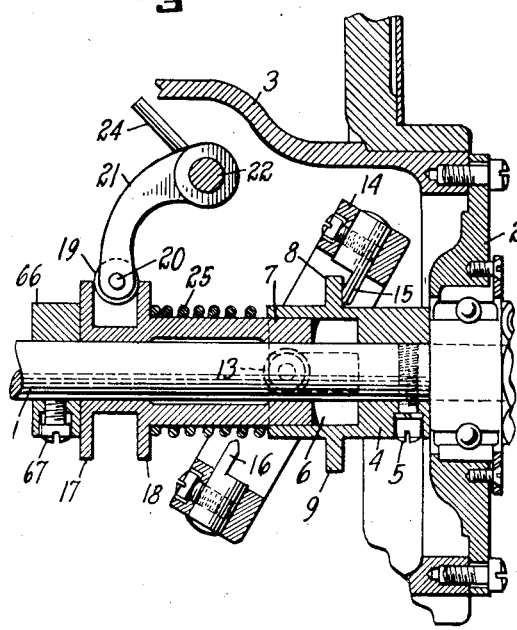

July 6, 1943.        A. KINDELMANN ET AL        2,323,664
SPEED CONTROLLED MECHANISM
Original Filed Aug. 5, 1938        3 Sheets-Sheet 1

INVENTORS
ALBERT KINDELMANN
EWALD BOECKING
BY Hastings W. Baker
ATTORNEY.

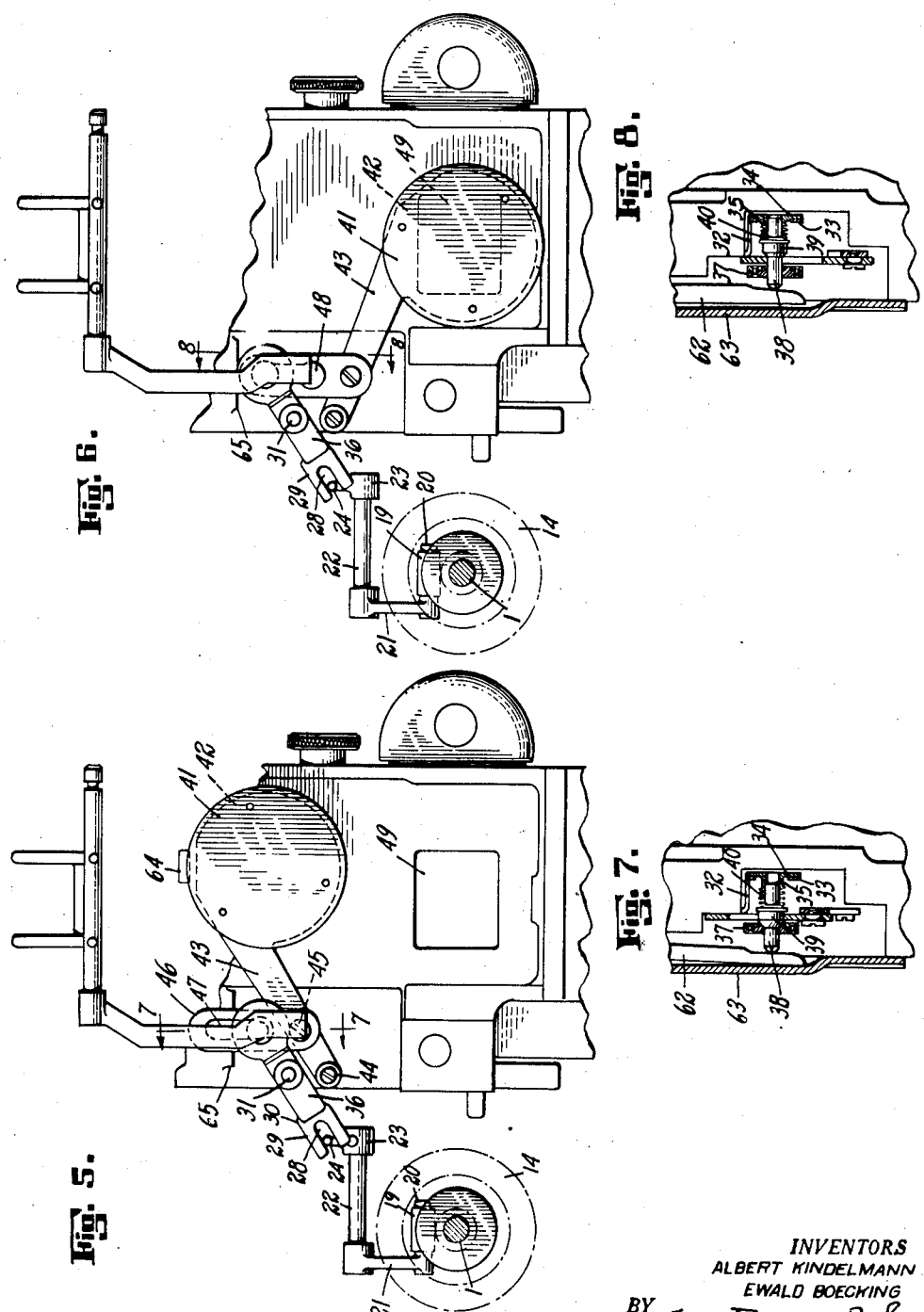

INVENTORS
ALBERT KINDELMANN
EWALD BOECKING
BY Hastings W. Baker
ATTORNEY.

Patented July 6, 1943

2,323,664

UNITED STATES PATENT OFFICE 2,323,664

SPEED CONTROLLED MECHANISM

Albert Kindelmann, Floral Park, and Ewald Boecking, Great Kills, N. Y., assignors to International Projector Corporation, New York, N. Y., a corporation of Delaware Original application August 5, 1938, Serial No. 223,195, now Patent No. 2,276,658, dated March 17, 1942. Divided and this application February 19, 1941, Serial No. 379,628

14 Claims. (Cl. 264—20)

This application is a division of applicants' co-pending application 223,195, filed August 5, 1938, now Patent No. 2,276,658, dated March 17, 1942, entitled Shutter control mechanism for moving picture projector. This divisional application is directed to that part of the invention shown in the aforementioned application relating to a speed responsive device. While in the said parent application the speed responsive device was described in connection with a motion picture fire shutter, the speed responsive mechanism forming the subject-matter of this divisional application is of general application and can be used in many machines having nothing to do with a motion picture projector. While the specification of the parent application is substantially copied and describes the governor in connection with a motion picture projector, this is done by way of illustration only and applicants desire to point out that the invention herein claimed is in no wise limited to any particular use.

The invention relates to a novel governor controlled by the velocity of a rotating shaft. It eliminates the requirement of having considerable space in which the revolving weighted arms might move outwardly. In our improved governor there are no arms adapted to move outwardly or inwardly as in the conventional governor.

Other objects and advantages of the invention will appear in the detailed specification and claims which follow.

The invention may be better understood by referring to the drawings in which we have attempted to show one form of embodiment of the invention.

Figure 2:
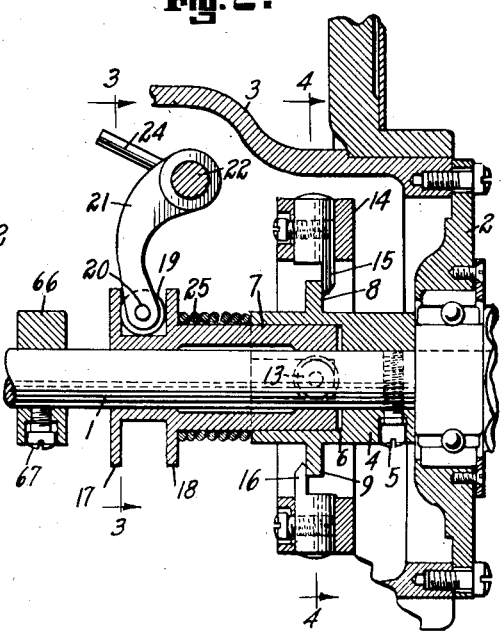
Figure 3:
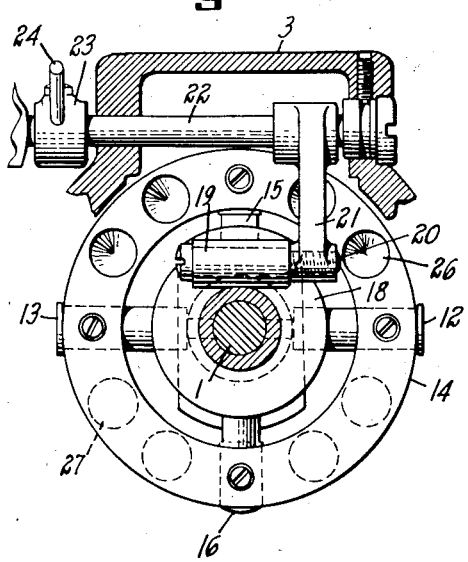
Figure 4:
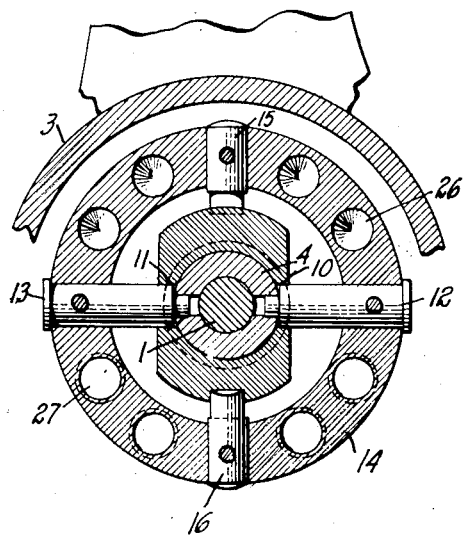
Figure 10:
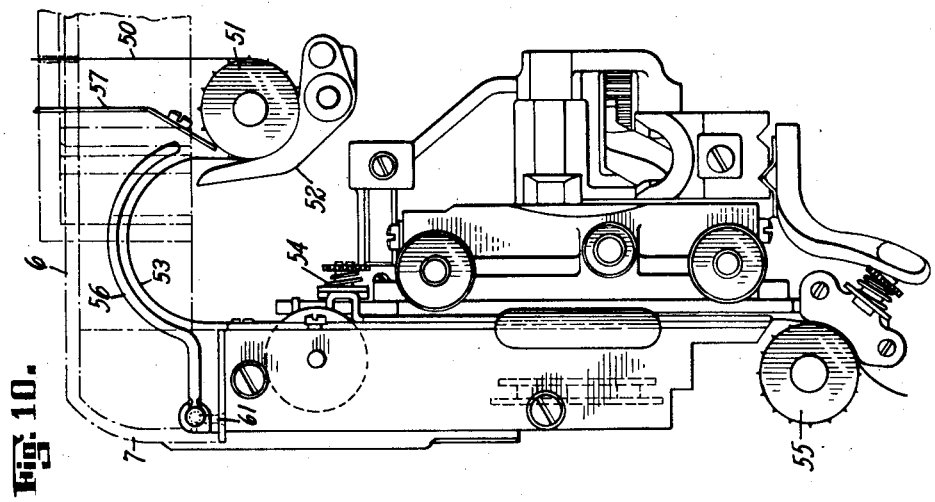
Figure 9:
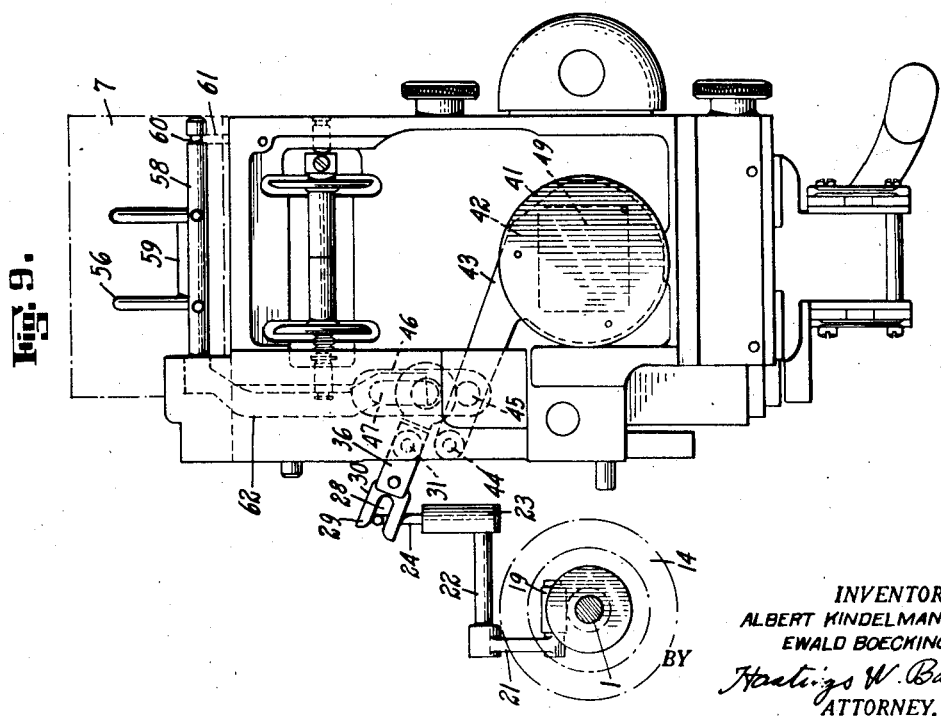

In the drawings,

Fig. 1 is a cross sectional view of the governor and its associated parts showing the parts in the position in which they would be when the rotating shutter shaft is stationary, Fig. 2 is a similar view showing the parts in the position in which they would be when the shutter shaft is rotating at normal operating velocity, Fig. 3 is a view partially in cross section taken on the line 3—3 of Fig. 2 looking in the direction of the arrows, Fig. 4 is a cross sectional view of the governor taken on the line 4—4 of Fig. 2 looking in the direction of the arrows, Fig. 5 is an elevational view of the fire shutter and its controlling mechanism, the parts being shown in the position in which they would be when the shutter is raised so as not to cut off the beam of light, Fig. 6 is a similar view showing the parts in the position in which they would be when the shutter is down, cutting off the beam of light. In this figure the shutter has been released by the film piling up against the film controlled mechanism, Fig. 7 is a detail view partly in cross section on the line 7—7 of Fig. 5 looking in the direction of the arrows and showing the parts in the position in which they would be when the film is being properly fed, Fig. 8 is a view similar to Fig. 7 but taken on the line 8—8 of Fig. 6, Fig. 9 is a view similar to Fig. 6 but showing the shutter in its down position cutting off the beam of light, it having been moved to its down position by the ring governor rotating at too slow a speed, and Fig. 10 is a view similar to Fig. 9 but taken at right angles thereto.

In the drawings like reference characters indicate the same parts in the several views.

We have provided a rotatable shutter shaft 1 which is mounted in a ball bearing assembly 2 carried by the frame 3. The shutter shaft 1 is operated by the main driving mechanism of the projector and, except in the case of an accident, it rotates at substantially uniform velocity. On it are mounted the conventional shutters which cut off the beam of light when the film is being intermittently fed. Inasmuch as these shutters form no part of the present invention they are not shown in the drawings.

A collar 4 is secured to the shaft 1 by means of a screw 5 passing through the said collar and shaft. This collar is internally cored for a portion of its length thereby forming a hollow sleeve 6 into which projects a slidable sleeve 7, which sleeve is slidable on the shaft 1. The sleeve 6 is provided with oppositely extending fingers 8 and 9, said fingers being on diametrically opposite sides of the sleeve 6. The sleeve 6 is provided with longitudinally extending slots 10 and 11 on opposite sides of the shaft 1 and spaced 90° from the mid-points of the fingers 8 and 9, as clearly shown in Fig. 4. Pins 12 and 13 extend through a ring governor 14, through the slots 10 and 11 respectively and into the sleeve 7, as clearly shown in Fig. 4. The ring governor 14 is provided with a pin 15 which is at all times in contact with the side of the finger 8 next to the ball bearing assembly 2 and it is also provided with a pin 16 diametrically opposite from the pin 15, which pin 16 sometimes engages the finger 9 as is shown in Fig. 2, and sometimes does not as is shown in Fig. 1. When the shaft 1 is rotating at its normal speed, the pin 16 should engage the finger 9, but on the side opposite from the ball bearing assembly 2, but when the shaft is stationary the parts assume the position shown in Fig. 1 in which the pin 16 is spaced a considerable distance from the finger 9.

The sleeve 7 is provided with two spaced flanges 17 and 18 and between these flanges is a roller 19 carried on an arbor 20 carried by a lever 21, pivoted to the frame of the machine on a pivot shaft 22. Also secured to this pivot shaft 22 is a boss 23 which carries a lever 24.

When the shaft 1 is at rest, a spring 25 interposed between the end of the sleeve 6 and the flange 18 urges the sleeve 7 to the left, as viewed in Fig. 1, so that the said lever 24 is raised or rotated clockwise and is held in this position. When the shaft 1 is rotated at normal speed, the ring governor moves from the position shown in Fig. 1 to the position shown in Fig. 2 compressing the spring 25 and moving the lever 24 in a counterclockwise direction, which means that the end thereof is lowered.

If the ring governor were composed of a solid ring of metal, it would tend to assume the position shown in Fig. 2 when the shaft was rotated, but this tendency would be resisted by the spring 25. In order to increase the force tending to move the governor into a plane perpendicular to the shaft 1, we have provided four holes 26 extending from the side opposite the ball bearing assembly 2 approximately through one-half the thickness of the ring. All of these holes 26 on the said side of the ring governor are on one-half of the complete circle of the ring and similar holes 27 extend from the opposite side of the ring which holes 27 are on the remaining one-half of the ring. Of course, there is no particular upper or lower position of any part of the ring for it rotates, but in order to make the explanation in regard to these holes clearer, let us assume that the ring was stationary. The holes 26 would extend in the upper half of the ring governor from the side opposite the ball bearing assembly approximately half way through the same, while the holes 27 would be in the bottom half of the ring governor and would extend through approximately one-half of the thickness of the said ring governor. The upper half and the lower half of the ring, therefore, have the same mass, but it will be noted that if you would cut the governor into two parts on substantially the line 4—4, Fig. 2, the upper and lower portions of each of these halves would then be of a considerably different mass. Since centrifugal force is proportional to mass times the square of the velocity and since the mass of the upper portion of the ring as shown in Fig. 4 would be greater on the side nearest the ball bearing assembly, the centrifugal force of the upper portion of the ring would be greater on the side nearest the ball bearing assembly, thereby tending to force the ring from the position shown in Fig. 1 to its upright position as shown in Fig. 2, and since the portion of the ring at the bottom has a less mass on the side opposite the ball bearing assembly than it has on the side nearest the ball bearing assembly, the ring would be powerfully urged into its upright position as shown in Fig. 2. By this construction the governor will assume a position perpendicular to its shaft in spite of the spring 25. As heretofore stated, we are using the expressions, upper portion of the ring and lower portion of the ring only for purposes of illustration for there is no particular upper portion of the ring or lower portion of the ring for the ring rotates, but the same facts will hold true regardless of what position the ring may at that instant occupy.

Of course, the pin 15 always bears against the finger 8 by the action of the spring 25 and the pin 16 would be moved by the spring 25 away from the finger 9 when the shaft 1 is not rotating, but would be moved by centrifugal force into engagement with the finger 9 when the shaft 1 is rotating at its normal velocity. A stop 66 is secured to the shaft 1 by means of a set screw 67 so as to positively limit the movement of the sleeve 7 thereby relieving any strain on the lever 24 when the shaft 1 is not rotating.

The lever 24 extends into a slot 28 between arms 29 of a lever 30 pivoted to the framework of the machine on a pivot pin 31. The lever 30 extends beyond the pivot pin 31 and is offset forming an arm 32, which arm is bent so as to extend parallel to the lever 30 and this parallel portion is denoted by the reference character 33. Secured to the part 33 is a plate 34 carrying an inwardly extending tubular part 35 extending through an aperture in the part 33. An arm 36 is secured to the lever 30 and extends inwardly beyond the pivot pin 31 forming an arm 37. A slidable pin 38 extends through a hole in the arm 37 and projects into the tubular part 35. It is provided with an enlarged ring 39 against which presses a spiral spring 40, the other end of which presses against the part 33.

A fire shutter 41 is carried by a shield 42 which is integral with an arm 43 pivoted on a pivot pin 44. The arm 33 carries a pin 45 which is pivoted to a bar 46 which is provided with a slot 47 which at its lower end terminates in an enlarged circular aperture 48.

When the shaft 1 is not rotating, the lever 24 will be in the position shown in Figs. 1 and 9 and the enlarged ring 39 would be received within the circular aperture 48. If the machine is now operated so that the shaft 1 rotates at its normal operating velocity, the lever 24 would be moved downwardly or counter-clockwise into the positions shown in Figs. 2 and 5. As the lever moved downwardly it would engage the lower arm 29 of the lever 30 and would depress the end of the arm and raise its inner end carrying the slidable pin 38 upwardly. The enlarged ring 39 would be seated in the circular aperture 48 and the bar 46 would, therefore, be raised, raising the fire shutter 41 into the position shown in Fig. 5. If, however, the shaft 1 were slowed down, it would have an ever increasing tendency to resume the position shown in Fig. 1 for its centrifugal action depends upon the square of the velocity. The tension of the spring 25 is such that if the shaft 1 materially slowed down, the lever 24 would be raised, which would raise the left hand end of the lever 30 as viewed in Fig. 5, lowering its inner end together with the pin 38, resulting in the fire shutter dropping and closing the aperture 49 through which projects the light from the arc lamp, not shown, which light then passes through the film. It is, therefore, apparent that if the film is being fed too slowly that there is danger of it catching on fire and the fire shutter will be dropped and it will automatically be raised when the film is again being fed at its normal operating velocity.

Referring to Fig. 10, the film 50 passes downwardly from a supply reel, not shown. It is fed continuously by a continuously rotating sprocket 51 passing beneath the said sprocket and above a guide 52. After passing the said continuously operating sprocket 51 it should form a loop 53 before passing through the film gate assembly 54. After passing the film gate assembly it passes an intermittently operated sprocket 55. The operating means for the continuously rotating sprocket and the intermittent sprocket are not shown as such mechanism is well understood in the art. The film will pass the aperture 49 near the lower portion of the film gate assembly. If the part of the film containing the sprocket holes should be damaged so that the film would not be intermittently fed by the intermittent sprocket 55, the result would be that the film would be stationary at the point where it passes the aperture 49 and the heat from the arc light at this point is intense. The result would be that the film would ignite unless the fire shutter can be dropped by the stopping of the film. It is, therefore, noted that the shaft 1 might continue its normal rate of rotation and yet the film would stop because the intermittent sprocket 55 is not pulling the film by the aperture at its proper velocity. The necessity of having some film controlled automatic means for controlling the fire shutter is also emphasized by the fact that possibly the film might tear in two after it has passed the aperture 49 and before it reached the sprocket 55. This accident would likewise leave film extending beyond the aperture 49 not being fed. Regardless of what may be the cause of the film not being fed when the machine is being operated, we have provided means to drop the fire shutter by the piling up of the film fed by the continuously operating sprocket 51.

If the film should not be pulled by the intermittently operated sprocket 51, the normal loop 53 would be enlarged and the film would pile up beneath a lever 56 and on the loop side of plate 57. The lever 56 is composed of a wire fixed to a shaft 58. This wire extends inwardly and then forms substantially arcuate sections as clearly shown in Fig. 10. It is then bent transversely forming an inner part 59 as shown in Fig. 9 and returns following substantially the same configuration as first described. This shaft 58 is rotatably mounted on the framework of the machine and in order to prevent longitudinal displacement it is provided with a channel 60 which receives a pin 61 extending through the framework. This shaft 58 is provided with a lever 62, the lower portion of which is adapted to bear against the end of the slidable pin 38. If, therefore, the film should not be properly fed by the intermittent sprocket 55, the film will pile up beneath the lever 56. The plate 57 acts as a confining means to confine the film beneath the lever 56 for otherwise it might bulge out above the sprocket 51 and not exert its full force on the lever 56. The pressure of this film piling up beneath the lever 56 will rest the same thereby rotating the shaft 58 and moving the lever 62 inwardly as viewed in Fig. 7 or into the position shown in Fig. 8, thereby moving the enlarged ring 39 from the circular aperture 48 and against the tension of the spring 40 so that the small part of the pin 38 and the end contacting the lever 62 will be projecting through the slot in the bar 46, thereby releasing the said bar and allowing the fire shutter 41 to fall by gravity to close the aperture 49.

Regardless of whether the operator quickly stopped the machine or not, no fire would result for the shutter is cutting off the beam of light and the heat. He would, of course, stop the machine in order to again place it in an operative condition and when he stopped the machine the shaft 1 would cease rotating so that the parts operated by the ring governor would assume the position shown in Fig. 9 as heretofore described. The operator in placing the machine in operative condition would, of course, remove the piled up part of the film beneath the lever 56 so that the lever 56 could resume its normal position as shown in Fig. 10 and the lever 62 would be moved against the wall 63 of the machine, thereby releasing the slidable pin 38 so that the spring 40 could move the said pin back into the position shown in Fig. 7, at which time the ring 39 would again be projected into the circular aperture 48 so that the fire shutter could be again raised when the machine was being operated and the shaft 1 was rotated at its normal velocity.

We have provided a stop 64 (Fig. 5). This stop would limit the upward movement of the shutter but it is not intended that this stop should normally contact the fire shutter or stop its movement. It would be disadvantageous to have the said stop actually engaging the shutter because the slidable pin 38 would then be bound so that it would make it difficult for the lever 62 to actuate it. We, therefore, intend to use the stop 64 simply as a safety stop but we have provided a stop 65 which is engaged by the inner end of the lever 30 positively stopping the said lever before the fire shutter has reached the safety stop 64. This prevents any binding of the slidable pin 38 and leaves it free to be operated.

By the above described mechanism it is obvious that if the shaft 1 is stationary or rotating at a low velocity, the fire shutter will close the aperture 39. When, however, the shaft 1 is rotating at its normal velocity it would raise the shutter 41. If thereafter, however, the film should be stopped with the shutter up, the film would pile up raising the lever 56 and moving the lever 62 so as to move the slidable pin 38 and thereby move the ring 39 out of the circular aperture 48 so that the slotted part 47 could move over the smaller part of the pin 38 and allow gravity to pull the fire shutter downwardly almost instantly closing the aperture 49. The parts would automatically be reset when the machine is stopped.

If the ring governor 14 had no depressions such as the holes 26 and 27 so that the ring was purely symmetrical, it would be unnecessary to have the finger 9 or the pin 16 for the governor could never assume a position beyond a vertical plane as viewed in Fig. 1, that is, it could not move from the position shown in Fig. 1 to a position beyond that shown in Fig. 2. The object in making the ring governor unbalanced by cutting away opposite sides or by providing the holes 26 and 27 is to make the mass of the ring nonsymmetrical. The center of mass would be urged to assume a vertical plane, but as viewed in Fig. 2 this center of mass would be to the right of the line 4—4 in the upper part of the figure and to the left thereof in the lower part of the figure, so that when the shaft was rotated at its usual operated velocity, the said governor would be inclined to move so that the pin 16 would tend to move beyond or to the right of the finger 9 and its movement is limited by the pin 16 actually engaging the finger 9 which serves as a stop for the part of the governor diametrically opposite from the pin 15 thereby preventing any tendency of the said governor to shift its plane by minute variations in the shaft 1.

We realize that many changes may be made in the specific form of the invention which we have shown by illustration merely in the drawings and without departing from the spirit of the invention. We, therefore, desire to claim the same broadly, except as we may limit ourselves in the appended claims.

Having now described our invention, we claim:

1. A speed controlled device including a rotatable shaft, a lug secured to said shaft, a sleeve slidable on said shaft, a ring, spindles carried by said ring and projecting into said sleeve, a pin carried by said ring and contacting said lug and serving as a pivot point for said ring, a spring urging said ring into an oblique position relative to said shaft, said ring when rotated at normal operating speed moving to a position at right angles to said shaft, thereby moving said sleeve longitudinally of said shaft and against the tension of said spring and means controlled by the movement of said sleeve.

2. In combination, a rotatable shaft, a lug secured to said shaft, a ring encircling said shaft and rotatable therewith, a finger carried by said ring, a spring holding said finger in continuous contact with said lug and tending to move said ring into an oblique position relative to said shaft, said ring when rotated at normal speed moving by centrifugal action from its oblique position and a sleeve on said shaft and operatively connected with said ring so that said sleeve is shifted as said ring moves toward or away from its oblique position.

3. In a speed responsive device, a rotatable shaft, a lug secured to said shaft, a ring encircling said shaft and rotatable therewith, a finger carried by said ring, a sleeve slidable on said shaft and operatively connected with said ring, a spring urging said ring into an oblique position relative to said shaft and holding said finger in contact with said lug, said ring tending to move away from its oblique position by centrifugal action when the shaft is rotated thereby sliding said sleeve on said shaft and means controlled by said sleeve.

4. In a speed responsive device, a rotatable shaft, a lug secured to said shaft, a ring surrounding said shaft and rotatable therewith, a finger carried by said ring, a sleeve slidable on said shaft and operatively connected with said ring, a spring tending to move said sleeve in one direction on said shaft and urging said ring into an oblique position relative to said shaft, said spring continuously holding said finger in engagement with said lug, said ring moving to a position so that a diametrical cross section thereof would be in a plane substantially perpendicular to the axis of said shaft when the shaft is rotated at normal speed, means whereby said sleeve is moved against the tension of said spring when the ring moves toward or away from its oblique position and means controlled by the movement of the said sleeve.

5. In a speed responsive device, a rotatable shaft, a ring surrounding said shaft and rotatable therewith, a lug secured to said shaft, a finger carried by said ring and held in continuous contact with said lug by said spring, said lug serving as a fulcrum for said ring, a sleeve slidable on said shaft and operatively connected with said ring, a spring tending to move said sleeve in one direction on said shaft and urging said ring into an oblique position relative to said shaft, said ring moving to a position so that a diametrical cross section thereof would be in a plane substantially perpendicular to the axis of said shaft when the shaft is rotated at normal speed and means to move said sleeve against the tension of said spring when the angular position of said ring relative to the said shaft is changed.

6. In a speed responsive device, a ring, a rotatable shaft, a sleeve rotatable with the shaft, and provided with diametrically extending holes, two radially extending pins carried by said ring and projecting into the holes of said sleeve, said pins forming the boundaries of two semi-circular halves of the ring, a portion of one face of one of the semi-circular halves being cut away in part, and a portion of the opposite face of the other semi-circular half being cut away in part, thereby forming a non-symmetrical ring, means tending to move said ring into an oblique position relative to said shaft, the centrifugal action of said ring when rotating moving said ring into a plane substantially perpendicular to said shaft, the said pins serving as a means to shift said sleeve when the angular position of the plane of said ring relative to said shaft is being changed.

7. In a speed responsive device, a rotatable shaft, a ring rotatable therewith and surrounding said shaft, a sleeve slidable on and rotatable with said shaft, pins, said ring being pivoted to said sleeve by said pins, the pins being so spaced as to divide the ring into two semi-circular halves, one face of one semi-circular half being cut away in part and the opposite face of the other semi-circular half being cut away in part, thereby forming a non-symmetrical ring, means tending to move said ring to an oblique position relative to said shaft, the centrifugal action of said ring when rotating moving said ring out of said oblique position, the said pin serving as a means to shift said sleeve when the angular position of the plane of said ring relative to said shaft is varied.

8. In a speed responsive device, a rotatable shaft, a ring rotatable therewith and surrounding said shaft, a sleeve splined on said shaft, pins, said ring being pivoted to said sleeve by said pins, the pins being so spaced as to divide the ring into two semi-circular halves, a fulcrum carried by one of the semi-circular halves of said ring and spaced substantially 90° from each of the two pins, the face of said half of the ring carrying the fulcrum being cut away in part on the side opposite the said fulcrum and the opposite face of the other semi-circular half being cut away in part.

9. As a subcombination of a speed responsive device, a rotatable shaft, a ring rotatable therewith and surrounding said shaft, a sleeve splined on said shaft, pins, said ring being pivoted to said sleeve by said pins, the pins being so spaced as to divide the ring into two semi-circular halves, one face of one semi-circular half being provided with depressions extending toward the opposite face and the opposite face of the other semi-circular half being provided with depressions extending toward the first semi-circular face.

10. In a speed responsive device, a rotatable shaft, a lug secured to said shaft, a ring surrounding said shaft and rotatable therewith, a finger carried by said ring, a sleeve splined on said shaft and operatively connected with said ring, two spaced plates carried by said sleeve and forming a valley therebetween, a spring tending to move said sleeve in one direction on said shaft and urging said ring into an oblique position relative to said shaft, said spring serving as a means to hold the finger in continuous engagement with the lug, said ring moving out of its oblique position by centrifugal action when the shaft is rotated at normal speed, said lug and finger serving as a means to move said sleeve and spaced plates against the tension of said spring when the ring is being moved out of its oblique position, and means extending into said valley actuated by the movement of said sleeve.

11. In a speed responsive device, a rotatable shaft, a lug secured to said shaft, a ring surrounding said shaft and rotatable therewith, a finger carried by said ring, a sleeve slidable on said shaft and operatively connected with said ring, two spaced plates carried by said sleeve and forming a valley therebetween, a spring tending to move said sleeve in one direction on said shaft and urging said ring into an oblique position relative to said shaft, said spring serving as a means to hold the finger in continuous engagement with the lug, said ring moving out of its oblique position by centrifugal action when the shaft is rotated at normal speed, said lug and finger serving as a means whereby said sleeve is shifted when the angular position of said ring relative to said shaft is changed and a lever extending into said valley and actuated by the movement of said sleeve.

12. As a subcombination of a speed responsive device, a rotatable ring composed of two semicircular halves, one face of one semicircular half being provided with depressions extending toward the opposite face and the opposite face of the other semicircular half being provided with depressions extending toward the first semicircular face the masses of each half being substantially equal, a plane passing through the central diameters of said ring dividing each of said halves into unequal masses.

13. As a subcombination of a speed responsive device, a rotatable ring composed of two semicircular halves one face of one semicircular half being provided with depressions extending toward the opposite face and the opposite face of the other semicircular half being provided with depressions extending toward the first semicircular face, pivot pins for said ring, spaced diametrically apart, the halves of said ring on opposite sides of said pins being of substantially equal masses, the parts of each of said halves on opposite sides of the central diametrical plane passing through each of said halves being of unequal masses.

14. As a subcombination of a speed responsive device, a ring governor composed of two semicircular halves one face of one semicircular half being provided with depressions extending toward the opposite face and the opposite face of the other semicircular half being provided with depressions extending toward the first semicircular face, diametrically opposite radial extending pins serving as a support on which said governor may turn, the two halves of the governor on opposite sides of said pins being substantially equal but unequally distributed so that the part of each of said halves on opposite sides of the central diametrical plane through the governor will be of relatively lesser and greater masses, the part of greater mass of one of said halves lying on the opposite side of said plane from that of the greater mass of the other of said halves.

ALBERT KINDELMANN.
EWALD BOECKING.